United States Patent [19]
Gardner

[11] 3,805,364
[45] Apr. 23, 1974

[54] METHOD OF MOUNTING CUTTER INSERTS IN BIT BODIES AND REMOVING THE SAME THEREFROM

[75] Inventor: Jimmy D. Gardner, Houston, Tex.

[73] Assignee: Mission Manufacturing Company, Houston, Tex.

[22] Filed: June 5, 1972

[21] Appl. No.: 259,921

Related U.S. Application Data

[62] Division of Ser. No. 855,208, Sept. 4, 1969, Pat. No. 3,693,736.

[52] U.S. Cl............... 29/426, 29/401 R, 29/401.3
[51] Int. Cl............................................. B23p 19/00
[58] Field of Search.............. 29/426; 175/410, 413; 299/92; 408/703

[56] References Cited
UNITED STATES PATENTS

| 3,618,683 | 11/1971 | Hughes | 175/410 |
| 3,537,539 | 4/1969 | Adcock | 175/413 |
| 3,357,507 | 12/1967 | Stewart | 175/410 |
| 1,522,593 | 1/1925 | Pickin | 175/413 |
| 3,342,531 | 9/1967 | Krekeller | 175/410 |
| 3,342,532 | 9/1967 | Krekeller | 175/410 |
| 3,388,757 | 6/1968 | Fittinger | 175/410 |
| 208,450 | 9/1878 | Winchester | 408/703 |
| 3,227,013 | 1/1966 | Zimmermann | 408/703 |

Primary Examiner—Charles W. Lanham
Assistant Examiner—James R. Duzan
Attorney, Agent, or Firm—Bertram H. Mann; Frank B. Pugsley

[57] ABSTRACT

A carbide cutter insert for a rock bit body is strengthened against breakage and its removal and replacement are facilitated by encasing the insert in a protective jacket of material substantially softer than the carbide. The composite element is then firmly pressed and/or bonded in an orifice in the cutting face of the bit body. The element can be readily removed simply by cutting away the softer jacket by a suitable machine tool operation without damaging the body bore.

2 Claims, 11 Drawing Figures

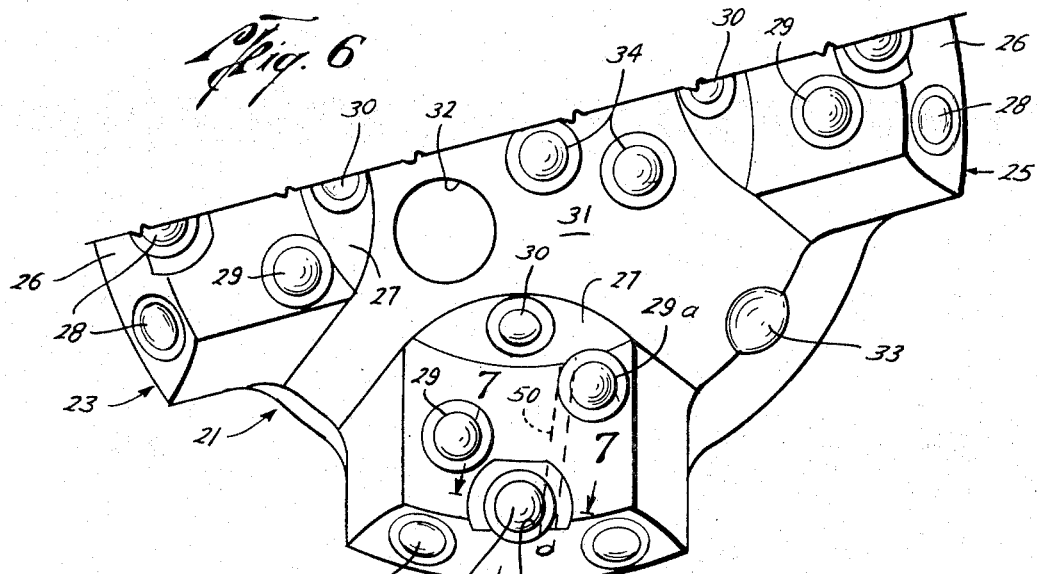
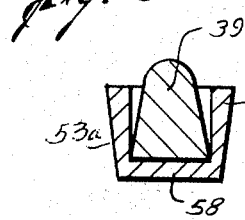
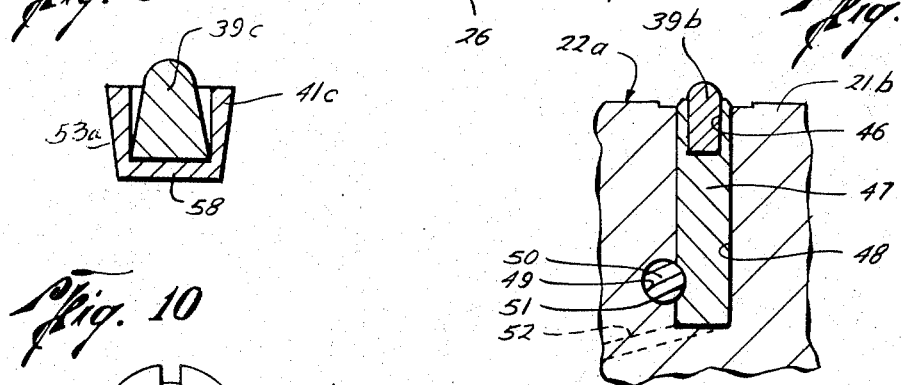
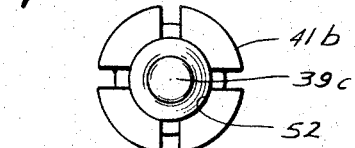
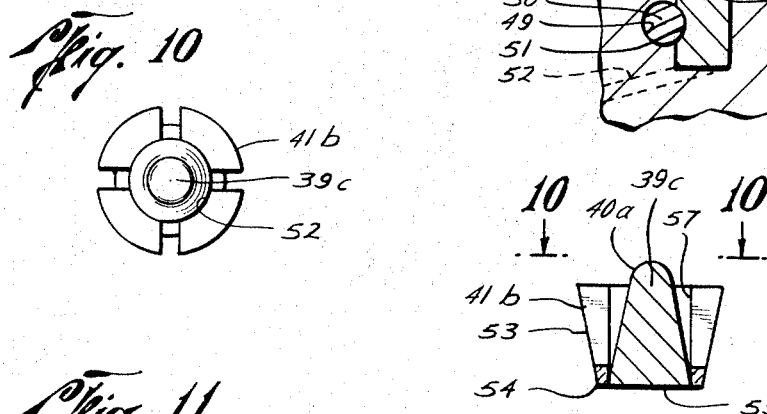
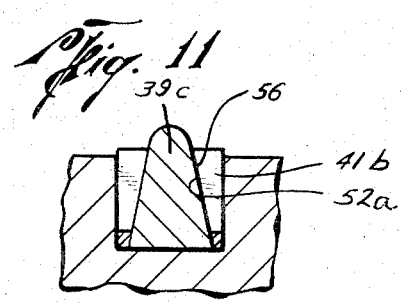

3,805,364

METHOD OF MOUNTING CUTTER INSERTS IN BIT BODIES AND REMOVING THE SAME THEREFROM

RELATED APPLICATION

This is a division of my copending U.S. application Ser. No. 855,208 filed Sept. 4, 1969, now Pat. No. 3,693,736.

BACKGROUND OF THE INVENTION

Many rock bits, both of the solid and rotary type, are provided with hardened cutter inserts, usually of tungsten carbide material, known popularly as carbide. While this material is quite hard, the units break and their cutting surfaces wear down in time, so that resharpening or replacement is required. Usually the inserts are secured in place by silver soldering so that they may be removed by a breaking up process and replaced. However, such removal is difficult and the large difference in thermal expansion between the carbide inserts and the steel body causes cooling cracks, and the poor surface wettability of the carbide by the solder ofen results in poor bond coverage percentage. On the other hand, if the carbides are secured in place by press fitting, they cannot be feasibly removed. In that case, the entire bit is thrown away when the inserts have become dull or broken. These inserts are quite brittle and their exposed parts fracturable by glancing blows placing the material under tension. This condition is aggravated by the fact that the mounting orifices in the bit body usually are slightly bell-mouthed due to the methods of formation.

Accordingly, an object of the present invention is to provide a method for firmly mounting carbide cutter inserts in rock bit bodies while facilitating removal of the inserts to permit their replacement and thus avoid the necessity of scrapping the entire bit body when the inserts become dull.

Another object is to provide a method for strengthening such carbide inserts.

Still another object is to provide a novel method of constructing a carbide insert composite.

BRIEF DESCRIPTION OF THE DRAWINGS

In the accompanying drawings which illustrate the invention,

FIG. 6 is a partial forward end view of a rock bit as in FIG. 1, but showing a slight modification.

FIG. 7 is a detail section taken substantially on line 7—7 of FIG. 6.

FIGS. 8 and 9 are longitudinal sections showing two different forms of armored carbide composites in an initial assembly stage.

FIG. 10 is an end view of the structure in FIG. 8.

FIG. 11 is a view of the structure in FIG. 8 after being driven into a matching orifice in the bit body.

DESCRIPTION OF THE PREFERRED EMBODIMENT

Figure 1:
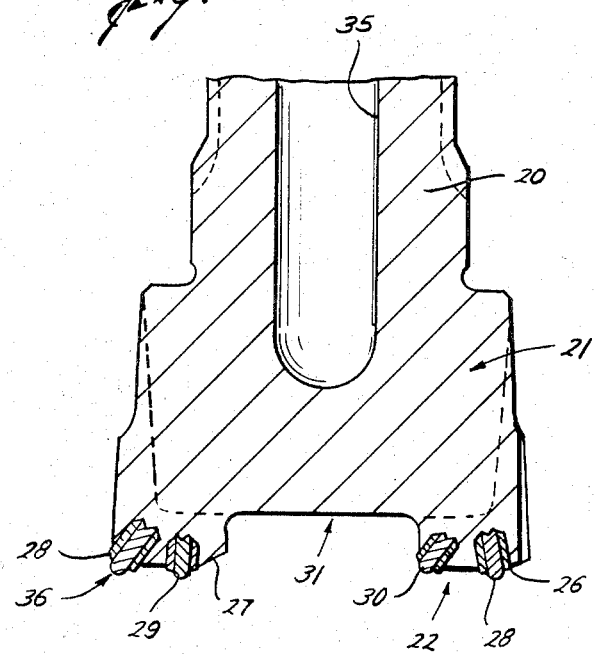
FIG. 1 is a partial transverse longitudinal section through a solid-type rock bit embodying one form of the invention.

FIG. 1 shows a more-or-less conventional, solid-type anvil-bit combination including a shank portion 20 forming part of the anvil of a percussion-type drill motor, and a bit body portion 21 having a forward cutter face, generally designated 22. As best shown in FIG. 6, the body is provided with wings 23, 24 and 25 terminating in peripheral chamfers 26 and inner chamfers 27 and mounting cutter insert composites as at 28, 29, and 30, corresponding inserts in each wing being similarly designated. The center portion 31 of the bit is elevated with respect to the bottom or forward cutting faces of the wings and is provided with washout holes as at 32 and 33 connecting with axial duct 35 in the anvil-bit shank 20 and additional composite cutter inserts as at 34. This type of rock bit body is merely exemplary, and various known types of bit bodies, either solid or rotary, may be utilized in connection with the invention as hereafter described.

Figure 2:
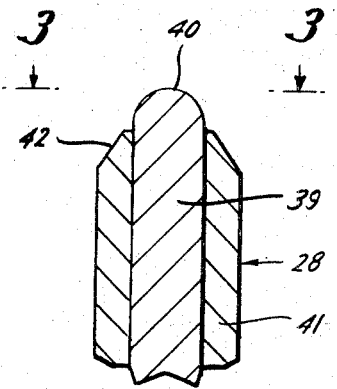
FIG. 2 is an enlarged longitudinal section through one of the cutter insert composites.
Figure 3:
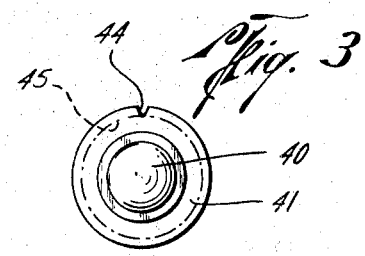
FIG. 3 is an end view of the structure in FIG. 2.
Figure 4:
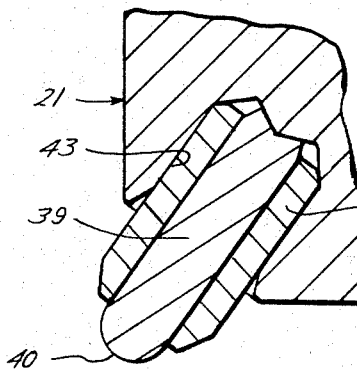
FIG. 4 is an enlarged view of a detail of FIG. 1 and showing the composite seated in an orifice in the bit body.

FIGS. 2, 3, and 4 illustrate in substantial enlargement one of the composite cutter inserts, say, one of the peripheral inserts 28. At the center of the insert there is provided a generally cylindrical tungsten carbide cutter element 39 having a suitable shaped—in this instance, curved—forward cutter extremity 40. Firmly applied about element 39 by press fit is the sleeve jacket 41 having a beveled forward extremity 42. FIG. 4 shows the assembly seated in an orifice 43 in the bit body. It has been found that in some instances element 29 may be heavily press fitted within sleeve 41 and the composite then press fitted within orifice 43. However, it may be found desirable to sweat sleeve 41 onto element 39, that is, by heating and cooling of the sleeve, and also sleeve 41 may be silver soldered in orifice 43 without the formation of thermal expansion cracks previously mentioned. In any case, the bottom of sleeve 41 and carbide element 39 should be firmly seated against the bottom of orifice 43. It will be observed that sleeve 41 projects somewhat beyond the mouth of orifice 43 and along the exposed part of carbide button element 39, thus providing reinforcement for the button. In addition, the carbide element will be held by the sleeve firmly in compression so as to be thereby further strengthened. Preferably, the sleeve should be made of steel having a high yield point and high ductility to accommodate and withstand the high compression forces.

FIG. 3 shows a small, radial longitudinal groove 44 formed in the outer surface of cylindrical sleeve 41. This serves two purposes. In the first instance, it provides a relief vent for air trapped in orifice 43 during the pressing of the composite element into position therein. Furthermore, the slot facilitates release of the carbide button element in that sleeve 41, of steel or other drillable material softer than the carbide button 39, which is substantially not machinable, may be cut away by a trepanning or other machine tool operation to release the button. The machining need cut only to the bottom or intermediately of groove 44, as suggested by dot-dash line 45, so that the hole wall will not be affected leaving a split sleeve extending around the hole when the remainder of the sleeve 41 is cut away. This remainder split sleeve can be readily collapsed and removed without damage to bore 43.

Figure 5:
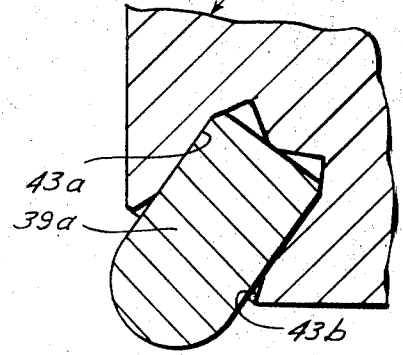
FIG. 5 is a view similar to FIG. 4 but showing prior practice in somewhat exaggerated form.

FIG. 5 illustrates prior practice in which a substantial part of carbide button element 39a is exposed outwardly of the bell mouth 43b of orifice 43a in bit body 21a. The peripheral cutter elements 28 and others at the gauge surface of the bit body are especially subject to glancing blows which heretofore have caused breakage of these carbides with resultant deterioration of the bit cutting capacity. Sleeve 41 of FIG. 2 does not prevent a bell mouth because it is initially longer than shown and is cut off after the pressing operation. This does not reduce the effective cutting life of the carbide, since the material of the sleeve, being softer than the carbide, wears away first so as to continuously expose additional carbide until the element is fully worn out.

FIGS. 6 and 7 illustrate a modified cutter insert assembly and means for locking the same in position in a bit body. In this instance, the carbide element 39b is mounted in the forward, cup-like orifice 46 of a conveniently cylindrical rod 47 of steel or like material somewhat softer than the carbide. The rod is seated in a long orifice 48 extending vertically into the cutter body through the forward cutter face 22a thereof. A bore 49 transversely intersecting orifice 47 receives a locking pin 50 which also seats in a recess 51 in rod 47 abreast of bore 49. Only one of the locking pins is shown in FIG. 6 cooperating with a pair of carbide composites, but each of the composites may be similarly locked in position in the bit body. Pin 50 can be removed and reinserted as through opposing wing chamfers 26 and 27. A passage 52 opening into the bottom of orifice 48 may accommodate a pressurized fluid, as gun grease, for forcing rod 47 out of orifice 48.

FIGS. 8, 9, 10, and 11 illustrate another means for anchoring the carbide element firmly in the bit body. In FIG. 8, sleeve 41b, initially, has a generally cylindrical inner surface 57 and a conical outer surface 53 tapering upwardly and outwardly from the smaller inner or bottom end 54. Carbide element 39c is tapered oppositely to sleeve outer surface 53, that is, upwardly and inwardly from its larger base portion 55, which fairly snugly fits within base portion 54 of the sleeve jacket, to its smaller outer or forward extremity 40a. When this assembly is driven into an orifice in the body which is approximately of the diameter of the base portion 54 of sleeve 41b, the sleeve is distorted or swaged, as illustrated in FIG. 11, to cause sleeve inner surface 52a to heavily encase carbide outer surface 56, thus locking both the sleeve and the carbide firmly in position in the bit body. In order to facilitate this action, sleeve 41b may be radially split as shown in FIG. 10. However, if inclines 53 and 56 are not too great, such splitting of the sleeve may not be necessary and the sleeve may be swaged into the distorted form shown in FIG. 11 upon the application of suitable pressure thereto.

The form in FIG. 9 is similar to that in FIG. 8 except for the provision of a bottom web 58 in jacket 41c with outwardly tapered outer surface 53a. Carbide element 39c is the same as in the previous form, and the method of firmly anchoring the carbide and sleeve into the body orifice is the same.

It is contemplated that the machinable sleeve or other jacket or cup be merely of adequate size to mount a carbide insert or several of them and that this jacket will then be suitably secured within the bit body either by a press fit or by brazing or silver soldering technique. The armoring jacket maintains the carbide insert under firm compressive forces so as to support and protect the element against chipping or breakage. The preferred form utilizes a cylindrical jacket, as in FIG. 4, for instance, which is best adapted for removal by a trepan or crown saw operation. Such saw may be guided by the carbide, particularly if the carbide is cylindrical, and may remove at least the inner portion of the metal sleeve so that the entire jacket and carbide may be withdrawn without damaging the bit body. The exclusive use of all modifications as come within the scope of the appended claims is contemplated.

I claim:

1. The method of mounting a carbide cutter insert in a bit body so as to facilitate removal of the insert by a trepanning tool comprising the steps of forming in the body a recess of greater cross-sectional area than said insert, firmly mounting a circumferentially continuous metal sleeve about the insert, and firmly securing the assembled sleeve and insert in said recess, the sleeve wall being of radial thickness greater than the thickness of the trepan tool to permit cutting away of the sleeve thereby to release said insert from the body without substantially affecting either the insert or the body.

2. The method described in claim 1 including the additional step of forming a longitudinal slot in the outer surface of the sleeve and extending only part-way through the sleeve wall whereby the severed remainder of the sleeve may be contracted for easy removal thereof from the recess.

* * * * *